United States Patent [19]

Field et al.

[11] Patent Number: 5,081,365

[45] Date of Patent: Jan. 14, 1992

[54] ELECTRIC HYBRID VEHICLE AND METHOD OF CONTROLLING IT

[76] Inventors: Bruce F. Field, 501 Theodore Wirth Pkwy., Unit 202, Golden Valley, Minn. 55422; Charles W. Bricher, 531 Raymond Ave., St. Paul, Minn. 55104

[21] Appl. No.: 534,116

[22] Filed: Jun. 6, 1990

[51] Int. Cl.$^5$ ................. F02B 73/00; B60L 11/00
[52] U.S. Cl. ........................... 290/45; 290/50
[58] Field of Search ........................ 290/45, 50

[56] References Cited

U.S. PATENT DOCUMENTS

| | | | |
|---|---|---|---|
| 3,888,325 | 6/1975 | Reinbeck | 290/45 |
| 3,904,883 | 9/1975 | Horwinski | 290/50 |
| 4,305,254 | 12/1981 | Kawakatsu et al. | 290/45 |

FOREIGN PATENT DOCUMENTS 8201170  4/1982  World Int. Prop. O. ............ 290/45

Primary Examiner—A. D. Pellinen
Assistant Examiner—Robert L. Hoover
Attorney, Agent, or Firm—Kinzer, Plyer, Dorn, McEachran & Jambor

[57] ABSTRACT

A method of operating a vehicle having an electric hybrid power system comprising a battery powered electric motor connected to drive the wheels of the vehicle and a combustion engine which may be releasably coupled mechanically to the electric motor. When so coupled the combustion engine may drive the vehicle and the electric motor may act as a generator to maintain a desired charge level in the batteries. In operation the power train is automatically controlled by a process controller to produce maximum fuel economy for the engine and to maintain the batteries at an acceptable charge level. Means are provided to apply the combined power of the electric motor and the combustion engine to the drive wheels for short duration peaking power. Means are also provided whereby the combustion engine may drive the electric motor to function as a generator and charge the batteries when the vehicle is stationary.

2 Claims, 4 Drawing Sheets

ELECTRIC HYBRID VEHICLE AND METHOD OF CONTROLLING IT

SUMMARY OF THE INVENTION

This invention relates to a highly efficient electric hybrid propulsion system for a vehicle, an electric hybrid propulsion system being one in which the vehicle is driven by an electric motor powered by batteries, the batteries being charged by a generator powered by a combustion engine. Electric hybrid propulsion systems are well known, and are disclosed, for example, in U.S. Pat. No. 4,306,156. In systems such as disclosed in the above U.S. patent the drive motor may be alternatively driven by the electrical output of a generator coupled to the engine or by current from the battery. When the drive motor is operated by current from the generator the batteries are being charged.

The present invention is directed to a different type of electric hybrid propulsion system. In the present invention there is an electric motor that is arranged to drive a vehicle, and there are batteries to power the motor. There is a combustion engine and means for it to recharge the batteries. However, there is no generator per se coupled to the engine. Rather, the engine is releasably coupled mechanically to the electric motor so that the engine power may be selectively applied toward driving the vehicle mechanically through the motor. When so coupled, and when operating conditions are such that less power is needed to propel the vehicle than the engine can develop, its excess power may be automatically applied to charge the batteries, using the electric motor as a generator. When more propulsion power is needed than the engine can supply, means are provided whereby the electric motor working as a motor can supply the balance by drawing on the batteries. This dual use of the electric motor as a motor and a generator eliminates the need for a separate generator coupled to the engine to charge the batteries, which saves weight and cost. The efficiency loss of a separate generator is thus avoided, which adds substantially to the efficiency of the system.

Automatic control means are provided to uncouple the engine and either shut it off or run it at idle speed when the batteries are sensed to be well charged as, for example, above 70% of full charge. In this mode the electric drive alone propels the vehicle. This provides very high fuel economy for the combustion engine.

The controls also provide for automatically re-starting the engine and re-coupling it to the electric motor when a lower level of battery charge is sensed. The engine will then drive the vehicle and supply some power to the electric motor which, acting as a generator, will recharge the batteries, so they are maintained at an acceptable charge level. The cruising range or operating time of the vehicle is thus limited only by the fuel supply for the engine, and by periodically refilling the fuel tank the range may be extended.

A mode of operation is provided which may be most useful in congested urban conditions where air pollution is a major concern. It permits uncoupling and stopping the combustion engine and operating with the electric motor and batteries only, thus providing operation that is completely free of air pollution from products of combustion. Another mode is provided which, after the batteries are acceptably charged, uses only the combustion engine and eliminates all current flow to or from the batteries. In this mode the electric motor serves only as a mechanical coupling for the engine. It is believed that this may be the most efficient mode in steady state operation. The control system thus provides more versatility in the utilization of the power components than previous designs have allowed.

A novel aspect of the invention is that it provides one manner of operating the vehicle in which it is possible to apply the combined power of the electric motor and the combustion engine to the drive wheels for short duration peaking power. Prior art electric hybrid propulsion systems such as the one disclosed in the aforementioned U.S. Pat. No. 4,306,156 can only apply the power of the electric motor. The control method of the present invention therefore provides for greater short term acceleration than prior art hybrid systems provided.

The invention thus provides a method for placing and controlling the elements of an electric hybrid propulsion system for a vehicle which provides increased efficiency of the electric and combustion power components. It provides an extended cruising range or operating time simply by refilling a fuel tank, and outstanding fuel economy by using hybrid or straight combustion engine power. It also provides a straight electric mode for urban driving that completely eliminates combustion pollution in the air and a means to apply the combined power of the electric motor and the combustion engine to the drive wheels for short term peaking power.

DETAILED DESCRIPTION OF THE INVENTION

Figure 1:
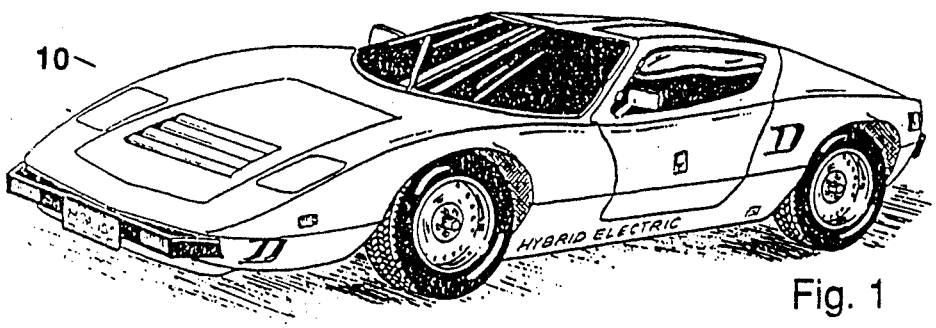
FIG. 1 shows an automobile which uses the electric hybrid drive of the present invention.

In FIG. 1 is shown an automobile, designated generally as 10, which has been built using the electric hybrid propulsion system and the related controls of the present invention. The automobile is a highly streamlined, two passenger vehicle which potentially has speed, acceleration and range comparable to current conventional gasoline automobiles while at the same time showing far greater fuel economy and far less air pollution than conventional cars. The drive system is compact enough to fit within the space allotted for drive components within a conventional automobile.

The invention is broad enough to be used in many other types of vehicles besides passenger automobiles. For example, it might be applied to a work vehicle such as a fork lift truck which might operate both indoors with electric propulsion and outdoors with combustion engine propulsion. The inventors are most familiar, however, with the aforementioned automobile which they have built, so it will be used as an example of the concept in the following description of the invention.

Figure 2:
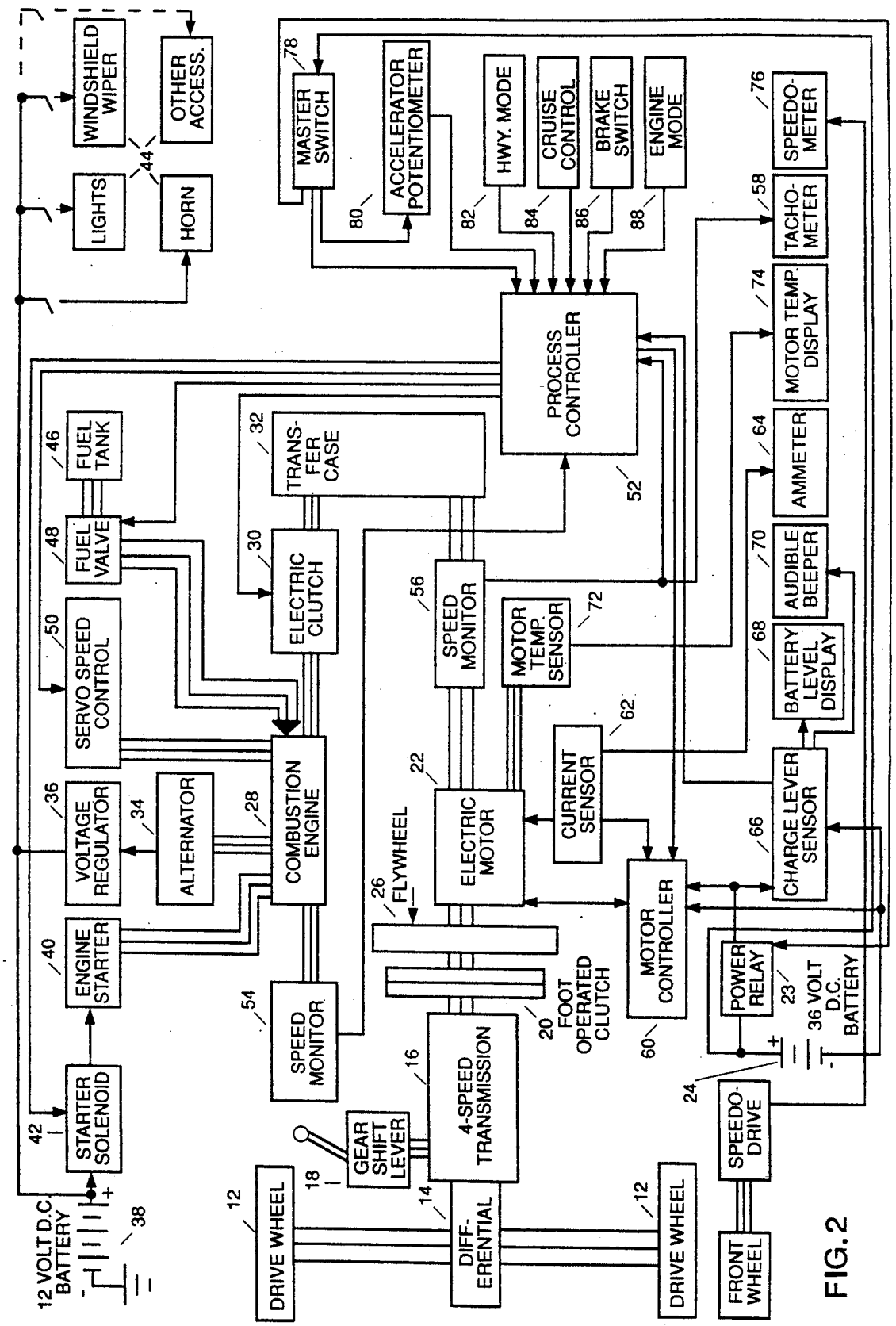
FIG. 2 is a block diagram of the power train and the controls for it as used in the automobile of FIG. 1.

FIG. 2 shows in block diagram form the electric hybrid power train and its related controls which comprise the present invention. Two ground engaging drive wheels 12 are shown. In the car that has been built these are the rear wheels of the vehicle. However, there is nothing in the invention which requires this; the drive wheels could as well be the front wheels of the car, or a 4-wheel drive system could be used, or a three wheeled tricycle. Any of these variations could be built and still embody the present invention.

The drive wheels 12 are connected by drive axles to a differential 14, the housing of which is attached to the housing of a 4-speed manual transmission 16. The transmission is controlled in conventional manner by a gear shift lever 18 and a foot-operated clutch 20. The clutch, gear shift lever, transmission, differential, drive wheels and manner of connecting the drive wheels to the differential are conventional, being similar to the corresponding parts used in Volkswagen cars in the period around 1970.

At 22 is shown an electric motor which is one of two prime movers of the vehicle. In the automobile which has been built, the motor 22 is a 7-horsepower, 36-volt, series wound DC motor. At 24 is shown a 36-volt battery pack consisting of six 6-volt batteries in series. If desired, a contactor plug (not shown) may be connected across battery pack 24 to connect the batteries to an off board battery charger. Such a means for recharging the batteries may be desirable at times, though under most conditions it will not be needed due to the on board charging capability of the hybrid system. The description of the invention will make it clear why an off board battery charger will seldom if ever be needed. A power relay 23 controlled by master switch 78 will interrupt all current flow between the batteries and the motor. The 36-volt motor and batteries are not the only type that could be used. Indeed, a higher voltage could give advantages in component weight and efficiency, while the motor size and battery capacity are parameters that would vary with the chosen vehicle weight and size.

A 20-pound flywheel 26 is attached to the shaft of motor 22. It maintains the angular momentum of the motor so that it will not slow down so abruptly under a regenerative braking load, which will be discussed later. It also provides a mounting surface for the foot operated clutch 20 which couples the output shaft of motor 22 to the input shaft of transmission 16. It will be understood that a housing encloses flywheel 26 and clutch 20 and connects the housing of motor 22 with the housing of transmission 16.

At 28 is shown a combustion engine, which is the second prime mover of the vehicle. In the car which has been built it is a 2-cylinder, 15-horsepower diesel engine, but it could be a spark ignition engine, a turbine, or any other practical prime mover. For convenience in this discussion it will be referred to as a diesel engine. Electric clutch 30 may be engaged or released at will. When engaged it couples engine 28 to the input shaft of transfer case 32, which is preferably a belt drive, but may be a gear or chain drive. The output shaft of transfer case 32 is coupled to the shaft of motor 22 at the opposite end of the motor from flywheel 26. It will be understood that transfer case 32 is needed only because of space limitations in the automobile. Space permitting, the output shaft of engine 28 could be aligned with the shaft of motor 22 and electric clutch 30 could selectively couple the engine and motor directly without any need for a transfer case. It will also be understood that requirements of available space in the automobile might dictate some other configuration for selectively coupling engine 28 to motor 22. For example, a third shaft with a transfer case on each end of it might be needed. The invention is broad enough to cover any configuration required, so long as engine 28 is coupled to motor 22 through means which may be engaged or released at will. The electric clutch 30 is a preferred device for this purpose due to the ease of controlling it, but other means could be employed, such as, for example, a centrifugal clutch.

Engine 28 is equipped with and drives a conventional alternator 34, which through voltage regulator 36 charges a battery 38. Battery 38 may be a single heavy duty 12-volt automotive battery, but preferably two such batteries are used in parallel. The added capacity thus obtained may be needed under certain operating conditions where engine 28 may be stopped and started frequently. Engine 28 also has a conventional starting motor 40 activated by starter solenoid 42 and powered by battery 38. A group of accessories collectively indicated as 44 include such conventional automotive equipment as horn, lights, windshield wiper, etc. They are powered from 12-volt battery 38. This 12-volt electrical system serves the needs of engine 28 and the accessory equipment of the car, but does not supply any power to the hybrid propulsion system.

Fuel for engine 28 is stored in fuel tank 46. A solenoid fuel valve 48 provides a means for stopping the diesel engine. If a gasoline engine were used, an ignition switch could fulfill this function.

The speed of engine 28 is controlled by a servo speed control 50 connected to the diesel engine fuel pump. If a gasoline engine were used, control 50 might be connected to the throttle, or whatever means might be provided for controlling the speed of the engine. Servo speed control 50 is a linear motor controlled by process controller 52 as will be described later.

A speed monitor 54, which is advantageously an eddy current sensor but may be another type, is mounted to read the speed of the engine output shaft, and another one at 56 is mounted to read the speed of motor 22. Their outputs are fed as inputs to process controller 52, and in addition the output of motor speed monitor 56 is displayed at a dashboard tachometer 58.

A transistorized motor speed controller 60 controls current flow to motor 22. Controller 60 is a commercially available pulse width modulation type such as, for example, one made by Curtis PMC of Dublin, Calif. It turns on and off an array of paralleled power MOSFET transistors to vary the average current to the motor in response to a signal from process controller 52.

A toroidal coil inductively coupled current sensor 62 surrounds one of the cables from motor controller 60 to motor 22. It senses the flow of current from battery 24 to motor 22 or vice versa and displays it as plus or minus current flow on dashboard ammeter 64.

A battery charge level sensor 66 reads the voltage across battery 24, compensates it for surface charge and interprets it as charge level in the battery. The output is fed to process controller 52, and also to a dashboard charge level display 68. Sensor 66 also has provision to sound an audible beeper as a warning to the driver if the battery charge drops to a critical level as, for example, 25% of full charge.

To complete the enumeration of the dashboard displays, there is a motor temperature sensor 72 which reads the temperature of motor 22 and displays it on the dashboard at 74 to alert the driver of a possible overload situation. And there is a conventional automotive speedometer 76 which in this particular automobile is driven by one of the front wheels of the car, but could be driven otherwise.

Manual controls within convenient reach of the driver give him or her control over the electric hybrid system. A master switch 78 controls power relay 23. Turning off switch 78 will stop all current flow to or from the 36-volt battery 24. This will, among other things, disable the process controller 52, which will in turn disable combustion engine 28. Only the 12-volt electrical system will remain powered up, and if desired it may be disabled also by putting a 12-volt relay in the line from the 12-volt battery 38 and controlling that relay also with the master switch.

A foot-operated accelerator pedal 80 has a conventional location on the floorboard and is the driver's means for increasing or decreasing speed. Pressing down on the pedal operates an associated potentiometer through a range from zero volts, corresponding to idle speed, to 10 volts, corresponding to full speed. This signal is fed to process controller 52. A highway mode switch 82 is located on the dashboard. With this switch the driver can select highway driving mode, which will be described in detail later. Cruise control push button 84 when pushed will send a signal to process controller 52 which will store in memory the electric motor speed existing when the cruise control button was pushed, and hold the electric motor close to that speed although the load on it may vary due to varying road conditions. This will maintain the road speed of the car close to the road speed existing when the cruise control button was pushed. If the driver wishes to discontinue the use of cruise control he or she may tap the brake pedal and brake switch 86 will send a signal to process controller 52 which will cancel the cruise control signal. Finally there is a switch 88 on the dashboard which initiates the engine mode by a signal to the process controller 52. This mode will also be described later.

OPERATION

The manner of operation of the electric hybrid automobile will now be described. There are three operating modes; urban mode, highway mode and engine mode. In addition there is a cruise control which can be used with any of the operating modes.

URBAN MODE

Urban mode uses a straight electric drive in which the batteries 24 power the electric motor 22 which drives the automobile, and the combustion engine 28 is not running. Urban mode is used to start the car from a standstill and get it up to highway speed. It is also useful for around town stop-and-go service. Driving is done conventionally. The driver first turns on master switch 78, which powers up the electric hybrid system. He or she then places the car in gear, using gear shift lever 18, foot operated clutch 20 and 4-speed transmission 16. There is a conventional foot accelerator pedal connected to accelerator potentiometer 80. Depressing the pedal directs a variable voltage from zero to 10 volts from the accelerator potentiometer 80 through the process controller 52 to the motor controller 60. The more the pedal is depressed the higher the voltage will be up to the 10-volt limit. This variable voltage causes motor controller 60 to feed a proportionate supply of current to electric motor 22 so that the car moves smoothly at a speed commanded by the driver. Forward and reverse are obtained in conventional automotive manner by shifting gears in transmission 16. When the car is moving and the driver takes his or her foot off the accelerator pedal the motor controller 60 will stop feeding current to motor 22. The still spinning motor will act like a generator and feed current back to the batteries 24, consuming some kinetic energy in so doing, which will tend to slow down the car. This so-called regenerative braking is well known. A flywheel 26 is attached to the shaft of motor 22 to maintains its angular momentum so it will not slow down too abruptly due to this dynamic braking.

Urban mode provides a convenient, virtually silent and essentially pollution free manner of operation. However, the range of the automobile will be limited by the capacity of the batteries 24. For cross country operation a greater range is needed, and this may be obtained by operating in highway mode or engine mode. Highway mode will be discussed next.

HIGHWAY MODE

After the car has been started in urban mode and brought up to some speed, for example 1000 RPM on the electric motor 22, the driver may elect to enter highway mode. This is done by pushing the "highway mode" button 82 on the dashboard. This command will cause process controller 52 to automatically operate the hybrid system in highway mode according to the logic shown in FIG. 3.

Figure 5:
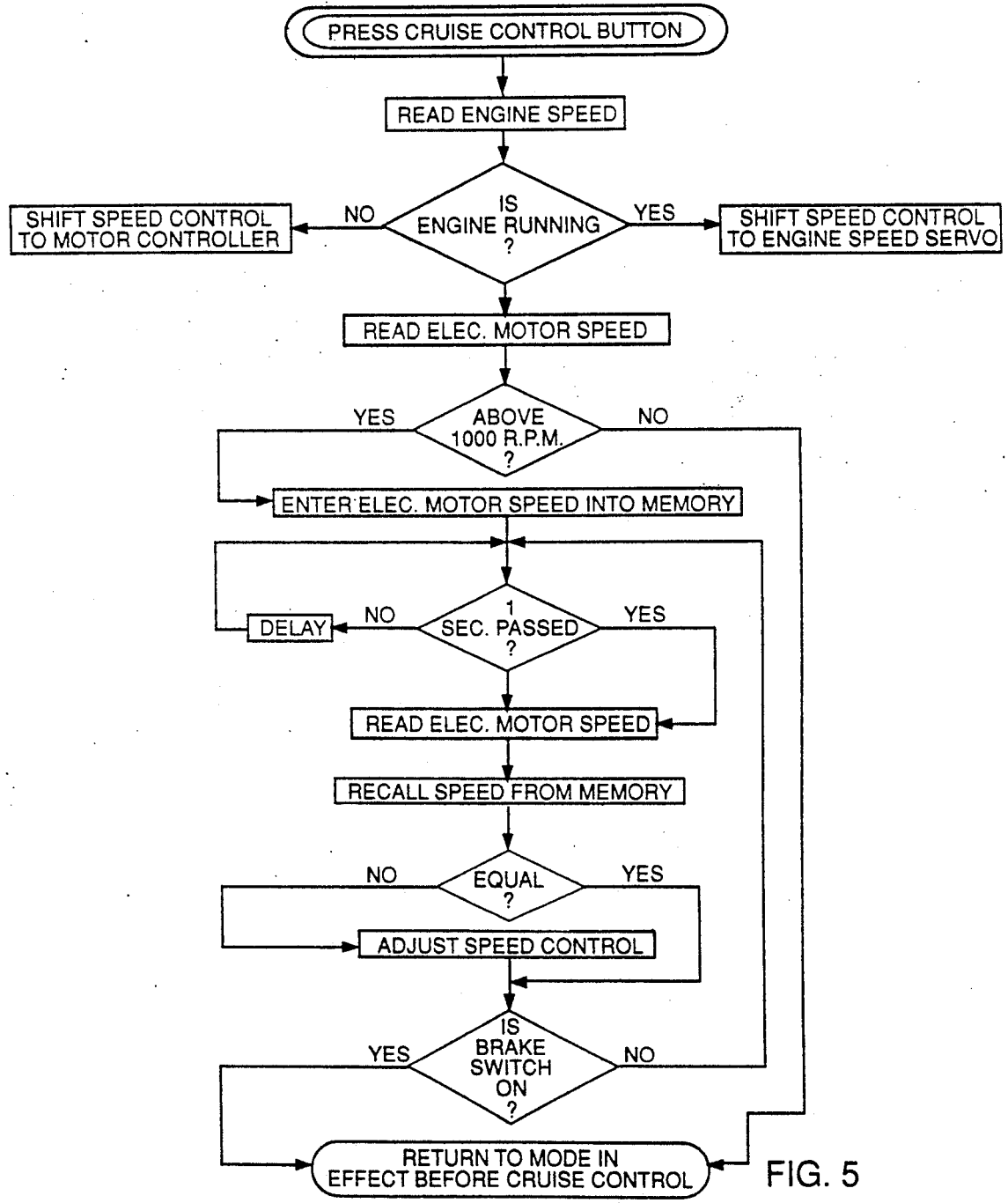
FIG. 5 is a flow chart of the control logic used in the cruise control subroutine in the automobile of FIG. 1.
Figure 3:
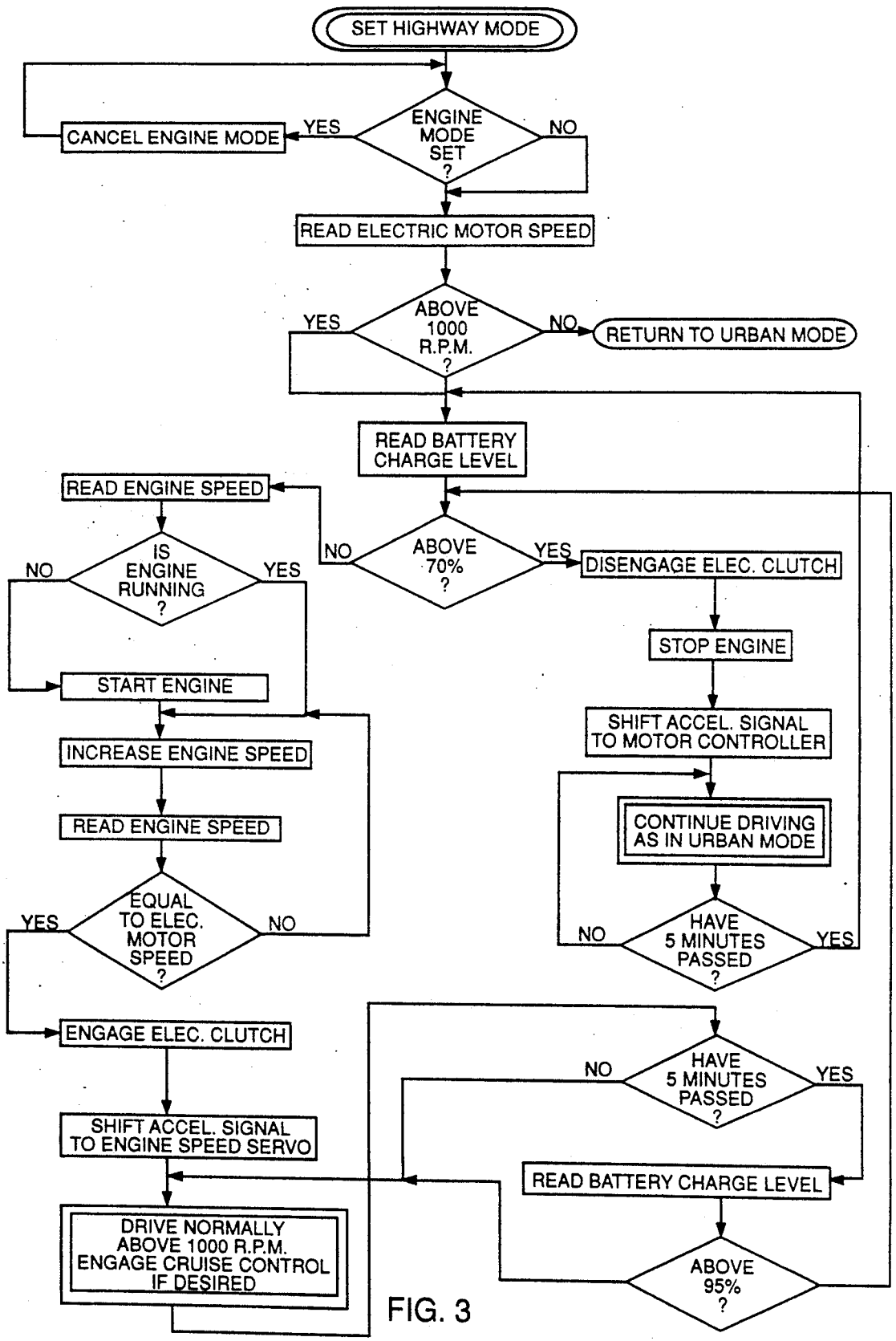
FIG. 3 is a flow chart of the control logic used in highway mode operation of the automobile of FIG. 1.
Figure 4:
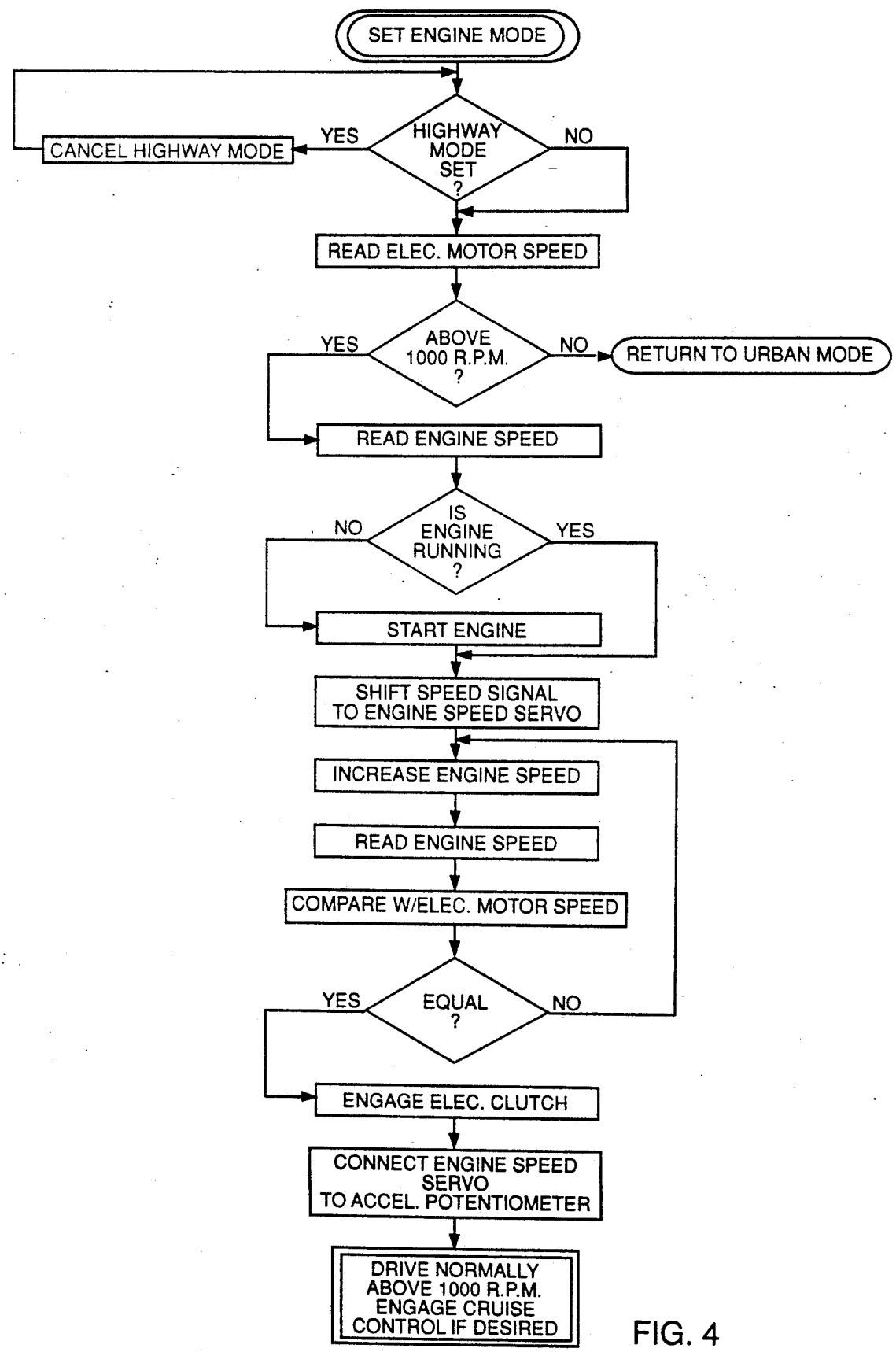
FIG. 4 is a flow chart of the control logic for the engine mode operation of the automobile of FIG. 1.

In FIGS. 3, 4 and 5, all of which are flow charts, blocks framed with double lines are manual operations performed by the driver, while blocks framed with single lines are automatic operations performed by process controller 52.

As shown in FIG. 3, after the driver manually selects highway mode the process controller 52 will ascertain that engine mode is not set, or cancel it if it is, and that the speed of motor 22 as sensed by speed monitor 56 is above 1000 RPM. It will then read the charge level of battery 24 as sensed by charge level sensor 66. If the battery is above a selected level, for example 70%, the process controller will stop the combustion engine 28 if it is running and disengage electric clutch 30 if it is engaged. Optionally it may be preferred not to stop the combustion engine but to slow it down to idle speed, and of course disengage the electric clutch. The process controller 52 will direct the signal from the accelerator potentiometer 80 to the motor controller 60. This will give the driver direct control of the speed of motor 22, so that he or she may drive in the same way as when using urban mode. The combustion engine will be shut off or idled, the electric clutch will be disengaged, and the electric motor 22 will drive the car, powered by batteries 24.

Every five minutes, or at some other selected time interval, the process controller will read the battery charge and when it drops below the selected level, which may be about 70%, the combustion engine 28 will be started if it is stopped, or brought up to speed if it is idling. The process controller starts the engine by opening solenoid fuel valve 48 and closing starter solenoid 42. Engine starter 40 will crank the engine until it starts, which will be indicated when engine speed monitor 54 reads a selected speed, for example 500 RPM. Starter solenoid 42 will then be opened and engine starter 40 will cease cranking. When the engine is running, the process controller can control its speed by sending a variable voltage speed signal to servo speed control 50. The process controller 52 can stop the engine 28 when that is desired by closing solenoid fuel valve 48. It should be understood that a solenoid fuel valve is used as a means of stopping a diesel engine, and that if some other type of engine were used, a different control might be used. For example, an ignition switch might be used with a gasoline engine.

After the combustion engine is running, the process controller 52 will read the speeds of the electric motor and the combustion engine from speed monitors 54 and 56 and adjust the engine speed with servo speed control 50 until the two speeds are equal. The process controller will then engage electric clutch 30, thereby coupling engine 28 mechanically to electric motor 22. The signal from accelerator potentiometer 80 will then be shifted to servo speed control 50 so that the driver can control the speed of the automobile by controlling the speed of engine 28. He or she may then continue to drive normally. Engine 28 will be powering the car.

In this condition there will be no signal from process controller 52 to motor controller 60, but motor 22 will be spinning, so motor controller 60 will call for regenerative braking. Motor 22 will act as a generator and supply current to the batteries 24. The rate of current flow will depend on the speed of the motor and the charge level of the batteries. This should be taken into account when setting the charge level at which the combustion engine is to be brought on line. A charge level of 70% seems to be suitable, but another level might be preferred.

Therefore in this condition engine 28 not only powers the car but also recharges the batteries 24. Every 5 minutes, or other selected time interval, the process controller will read the charge level of the batteries. When they are essentially fully charged, for example at 95% charge level, the process controller will disengage electric clutch 30 and stop engine 28 by closing solenoid fuel valve 48 or operating other suitable control means. Alternatively, the engine may be idled rather than stopped. The signal from the accelerator potentiometer 80 will be shifted from servo speed control 50 to motor controller 60 and operation of the car will revert to fully electric.

This alternating sequence of operating on the batteries until they are partially discharged, then operating on the combustion engine until the batteries are charged up, then back to the batteries, will continue as long as the driver keeps the car in highway mode. It is a very efficient mode of operation. It runs the combustion engine near its rated power and hence near its maximum efficiency for part of the time, then shuts it off to save fuel and uses electric power. However, the batteries are never deeply depleted, so there is always good battery capacity available for urban mode operation when needed. Range is limited only by the fuel consumption of the engine 28 and the size of the fuel tank 46. As with a conventional car, periodically refilling the fuel tank will extend the range.

To leave the highway mode, the driver would push the "engine mode" button. Above 1000 RPM on the electric motor the car will go into engine mode. Below 1000 RPM it will go into urban mode.

ENGINE MODE

Engine mode may be elected by the driver after the car has reached 1000 RPM or more on the electric motor 22 by operation in either urban or highway mode. The control logic for engine mode is shown in FIG. 4. After the driver manually selects engine mode, the process controller 52 will ascertain that highway mode is not set, or cancel it if it is, and that the speed of motor 22 as sensed by speed monitor 56 is above 1000 RPM. It will then start combustion engine 28 if it is not running and bring it up to speed by the same control sequence as was described in the highway mode. Engine 28 will be brought up to the speed of electric motor 22 and mechanically coupled to it by engaging electric clutch 30. The signal from accelerator potentiometer 80 will then be connected to the engine servo speed control 50, which will give the driver control of the speed of the car by varying the speed of combustion engine 28. There will be no signal to motor controller 60, and since electric motor 22 will be spinning there will be a regenerative braking effect which will cause motor 22, acting as a generator, to charge the batteries 24. This charging will taper off as the batteries approach full charge due to the characteristics built into motor controller 60. When the batteries are fully charged the current flow from motor 22 will be negligible, and then the motor will be functioning essentially as an element in the mechanical coupling of engine 28 to transmission 16. The car will be driven like any conventional automobile with a manual transmission. Engine mode provides an economical manner of operation. The efficiency losses inherent in electric motor 22 are largely eliminated, and there is no changing back and forth from combustion engine to electric motor and vice versa. To leave engine mode the driver would push the "highway mode" button. Above 1000 RPM on the electric motor the car will go into highway mode. Below 1000 RPM it will go into urban mode.

CRUISE CONTROL

The invention provides a cruise control which has the same functional purpose as a cruise control in a conventional automobile but which operates in a different way. Like a conventional cruise control it will hold the car at a desired speed although road conditions may vary. It can be operated in any mode when electric motor 22 is above a selected speed, for example 1000 RPM. FIG. 5 shows a flow chart of the cruise control logic. The driver actuates it by manually pushing "cruise control" button 84. Process controller 52 will then read the engine speed monitor 54 to ascertain whether or not the combustion engine is running, and depending on the outcome will connect a speed control signal either to electric motor controller 60 or to engine speed servo 50. This speed control signal is a variable voltage signal generated in process controller 52, similar to the signal generated by accelerator potentiometer 80. Next the process controller will ascertain that motor 22 is running faster than 1000 RPM, and if so it enters the motor speed into memory. Thereafter at 1-second intervals it will read motor speed monitor 56 and compare it to the stored motor speed. If they are equal no change will be made. If they are unequal a suitable adjustment will be made in the speed control so that an essentially constant speed will be maintained. Tapping the brake pedal will close brake switch 86, which will deactivate the cruise control and return control to the driver in the mode in effect prior to use of the cruise control.

It should be pointed out that during cruise control operation the signal from accelerator potentiometer 80 is not needed or used to control the speed of the car. It is available for some other use. The invention takes advantage of this when the cruise control is applied during engine mode operation. In that situation the process controller connects the accelerator potentiometer signal to the motor controller 60. This gives the driver an option of depressing the accelerator pedal and feeding current to electric motor 22 while the combustion engine is running. In this way the power of both the combustion engine and the electric motor can be applied simultaneously to power the car. This may be especially useful for short duration peaking power, as for example when passing a car on a two-lane highway. Neither the combustion engine nor the electric motor alone is powerful enough to accelerate the car rapidly, but when applied together they can give it performance comparable to a conventional car having a much larger engine. This feature is thought to be unique among electric hybrid automobiles.

Another capability of this control system should also be pointed out. It is possible to charge the batteries 24 when the car is sitting still, using the power of combustion engine 28 to do it. This may be useful if travel is not desired, the batteries are low, and no off board battery charger is available. To charge the batteries in this manner, first place transmission 16 in neutral and set the parking brake on the car. Then, using urban mode, bring the electric motor up to a speed above 1000 RPM and engage engine mode. After the combustion engine is running, bring the electric motor up to a desired operating speed with the accelerator pedal and engage cruise control. The engine will now continue to drive the motor at the desired constant speed while the car is sitting still. The motor controller will be receiving no control signal so it will call for regenerative braking, which will cause the motor to act as a generator and charge the batteries. As they approach full charge the current flow will be tapered off by the motor controller. To completely stop the charging, however, it will be necessary to stop the electric motor, which may be easily done by shutting off master switch 78 and stopping everything. Because of this stationary battery charging capability an off board battery charger will seldom be needed.

What is claimed is:

1. In a vehicle having an electric hybrid power system comprising an electric motor suitably coupled mechanically to drive one or more ground engaging wheels, battery means for storing electricity in suitable form to power the electric motor, a combustion engine and a supply of fuel for it so arranged that the engine may be releasably coupled mechanically to the electric motor, whereby the engine may drive the electric motor and whereby the electric motor when driven by the engine may be selectively operated as a mechanical coupling to transmit engine power mechanically to the wheels, or as a battery powered electric motor to supply power to the wheels, or as a generator to supply electricity to the battery means, or as some combination of said coupling, motor and generator, a motor controller to supply a controllably variable flow of electrical current to the electric motor from the battery means or to the battery means from the electric motor, during which latter condition the electric motor is operating as a generator, a process controller having inputs from a variable accelerator control, a highway mode switch, an engine mode switch, a cruise control switch, a brake switch, a sensor reporting the charge level of the battery means, and speed sensors reporting the speeds of the electric motor and the combustion engine, and having outputs to the motor controller, to means for starting and stopping the combustion engine, to means for controlling and varying the speed of the combustion engine, and to means to selectively effect mechanical coupling of the combustion engine and the electric motor, a cruise control which can function through the process controller to maintain the electric motor at an essentially constant speed by controlling the speed output of the combustion engine or the electric motor in spite of variations in the load on the combustion engine or the electric motor and regardless of whether the vehicle is being powered by the electric motor or the combustion engine, and regardless of whether the vehicle is moving or stationary, a method of controlling the hybrid power system comprising:

a) operating the vehicle in a first or urban mode in which the combustion engine is mechanically uncoupled from the electric motor so all the power for driving the vehicle comes from the electric motor, and at desired rates of acceleration and steady speed by controlling current flow to the electric motor from the battery means, and during desired periods of deceleration feeding current from the electric motor to the battery means, with the electric motor operating as a generator, the current flow to or from the electric motor during said urban mode operation being controlled by said motor controller which in turn is controlled by said variable accelerator control, or b) operating the vehicle in a second or highway mode after the vehicle is in motion and the electric motor is rotating above a pre-selected speed by sensing the charge level of the battery means and comparing it to a first pre-established charge level, and if the battery means charge level is above the said first pre-established charge level operating the vehicle in a first operating condition which is the same as the said urban mode, except that the combustion engine may optionally be operating at idle speed instead of stopped, but if the charge level of the battery means is at or below the said first pre-established charge level, operating in a second operating condition by starting the combustion engine and/or bringing it up to the speed at which the electric motor is then being operated, then mechanically coupling the combustion engine to the electric motor, thus connecting the combustion engine power mechanically to the electric motor and to the ground engaging drive wheels of the vehicle, whereby the vehicle may be driven by a portion of the power of the combustion engine and the balance of the combustion engine power may be used by the electric motor which, acting as a generator, will recharge the battery means, periodically monitoring the charge level of the battery means until it builds up to a second pre-established charge level which is higher than the first pre-established charge level, then reverting to the said first operating condition, and continuing to thus alternate between said first operating condition and said second operating condition, or c) operating the automobile in a third or engine mode in which the combustion engine is mechanically coupled continuously to the electric motor and thereby mechanically connected continuously to the ground engaging drive wheels of the vehicle regardless of the charge level of the battery means, and d) operating the cruise control when desired in conjunction with the third or engine mode to control the speed of the electric motor, in which condition the accelerator pedal may be used if desired to direct the motor controller to feed current from the battery means to the electric motor to provide power from the electric motor to supplement the power of the combustion engine, or e) operating the combustion engine when the vehicle is stationary to power the electric motor which, acting as a generator, will charge the battery means, with the speed of the combustion engine being held constant by the cruise control, and f) controlling all the functions in the urban, highway and engine modes and all the functions of the cruise control by the process controller so that all the functions are controlled and performed automatically.

2. The control method for the electric hybrid vehicle of claim 1 in which the first pre-established battery means charge level is approximately 70% of full battery means charge level and the second pre-established battery means charge level is approximately 95% of full battery means charge level.

* * * * *